000
United States Patent

Nagle et al.

(10) Patent No.: US 7,789,434 B2
(45) Date of Patent: Sep. 7, 2010

(54) COUPLING WITH CONCAVE BEARING SURFACE

(75) Inventors: William A. Nagle, Laureldale, PA (US);
Michael V. Porter, Easton, PA (US);
Scott D. Madara, Nazareth, PA (US);
Douglas R. Dole, Whitehouse Station, NJ (US)

(73) Assignee: Victaulic Company, Easton, PA (US)

( * ) Notice: Subject to any disclaimer, the term of this patent is extended or adjusted under 35 U.S.C. 154(b) by 33 days.

(21) Appl. No.: 11/565,739

(22) Filed: Dec. 1, 2006

(65) Prior Publication Data

US 2008/0129048 A1    Jun. 5, 2008

(51) Int. Cl.
*F16L 17/06* (2006.01)
*F16L 23/08* (2006.01)
(52) U.S. Cl. .................. 285/367; 285/111; 285/373; 285/420
(58) Field of Classification Search ............. 285/111, 285/112, 367, 368, 412, 420, 373; 411/537, 411/538
See application file for complete search history.

(56) References Cited

U.S. PATENT DOCUMENTS

| 815,581 | A * | 3/1906 | Dean ........................ 285/184 |
| 1,352,918 | A * | 9/1920 | Rohbock .................. 411/392 |
| 1,970,078 | A | 8/1934 | Dillon ........................ 285/18 |
| 2,616,946 | A * | 11/1952 | Scheer ........................ 174/151 |
| 3,135,154 | A * | 6/1964 | Zenzic ........................ 411/12 |
| 3,189,969 | A | 6/1965 | Sweet ........................ 24/279 |
| 3,285,568 | A * | 11/1966 | Biach ........................ 254/29 A |
| 3,313,197 | A * | 4/1967 | Knohl ........................ 411/387.1 |
| 3,386,771 | A * | 6/1968 | Verdier ................... 301/35.625 |
| 4,522,434 | A | 6/1985 | Webb |
| 4,717,299 | A * | 1/1988 | Underwood ................. 411/11 |
| 4,893,843 | A * | 1/1990 | DeRaymond ............... 277/616 |
| 5,190,324 | A | 3/1993 | Bird et al. .................... 285/328 |
| 5,230,537 | A | 7/1993 | Newman ..................... 285/112 |
| 5,301,986 | A | 4/1994 | Yehezkeli ................... 285/367 |
| 5,509,702 | A | 4/1996 | Warehime et al. .......... 285/409 |
| 5,651,588 | A * | 7/1997 | Kato ...................... 301/35.626 |
| 5,697,650 | A * | 12/1997 | Brown ........................ 285/197 |
| 5,899,507 | A | 5/1999 | Schroeder et al. .......... 285/343 |
| 6,139,069 | A * | 10/2000 | Radzik ....................... 285/112 |
| 6,361,085 | B2 * | 3/2002 | Nguyen ...................... 285/368 |
| 6,758,501 | B2 * | 7/2004 | Amedure et al. ............ 285/373 |
| 7,090,259 | B2 * | 8/2006 | Dole ........................... 285/367 |
| 7,118,317 | B2 * | 10/2006 | Hofschneider .............. 411/402 |
| 7,243,955 | B2 * | 7/2007 | Krausz et al. ............... 285/236 |
| 2003/0234541 | A1 * | 12/2003 | Thompson ................. 285/412 |
| 2005/0082831 | A1 | 4/2005 | Borland ...................... 285/369 |

(Continued)

FOREIGN PATENT DOCUMENTS

EP    07838607.5    12/2009

*Primary Examiner*—James M Hewitt
(74) *Attorney, Agent, or Firm*—Ballard Spahr LLP

(57) ABSTRACT

A concave bearing surface for use with lugs of pipe coupling segments and a method of joining pipe ends. The concave bearing surface is positioned on the lug and surrounds an aperture which receives a fastener attaching the coupling segments together end to end surrounding pipe ends to be joined. Either the nut or the head of the fastener that engages the concave surface may be rotated to tighten the fastener. Engagement between the concave surface and the rotating member reduces the torque required to tighten the fastener and effect a stiff, fluid tight joint.

26 Claims, 5 Drawing Sheets

U.S. PATENT DOCUMENTS

2005/0225087 A1* 10/2005 McMahon et al. .......... 285/412
2005/0253382 A1* 11/2005 Gibb et al. .................. 285/111
2005/0253383 A1* 11/2005 Gibb et al. .................. 285/112
2008/0048444 A1* 2/2008 Porter et al. ................ 285/367

* cited by examiner

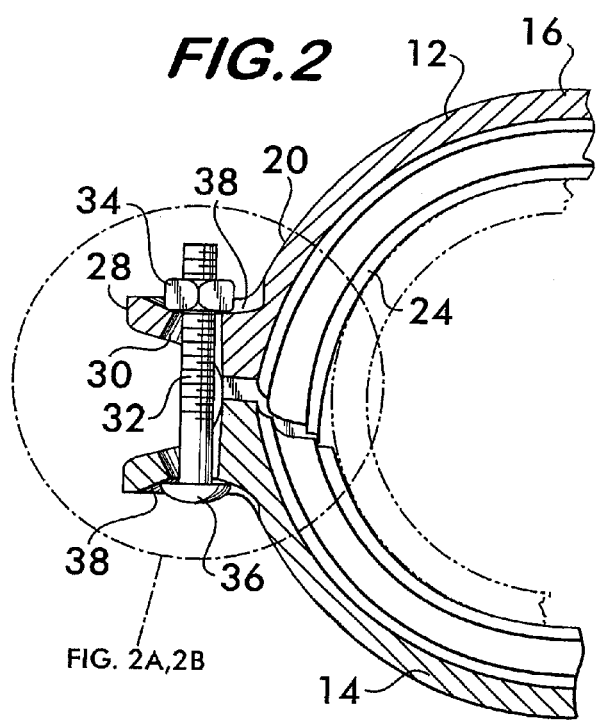
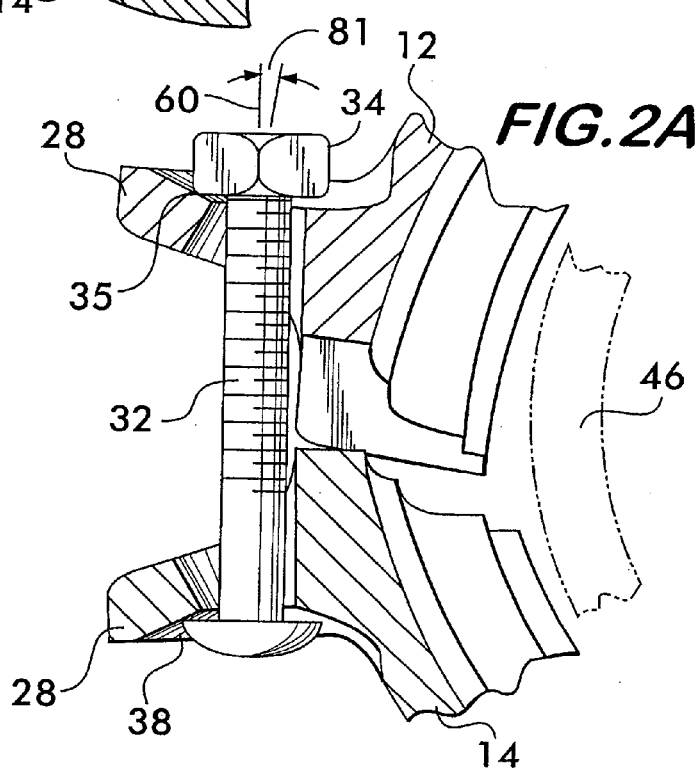

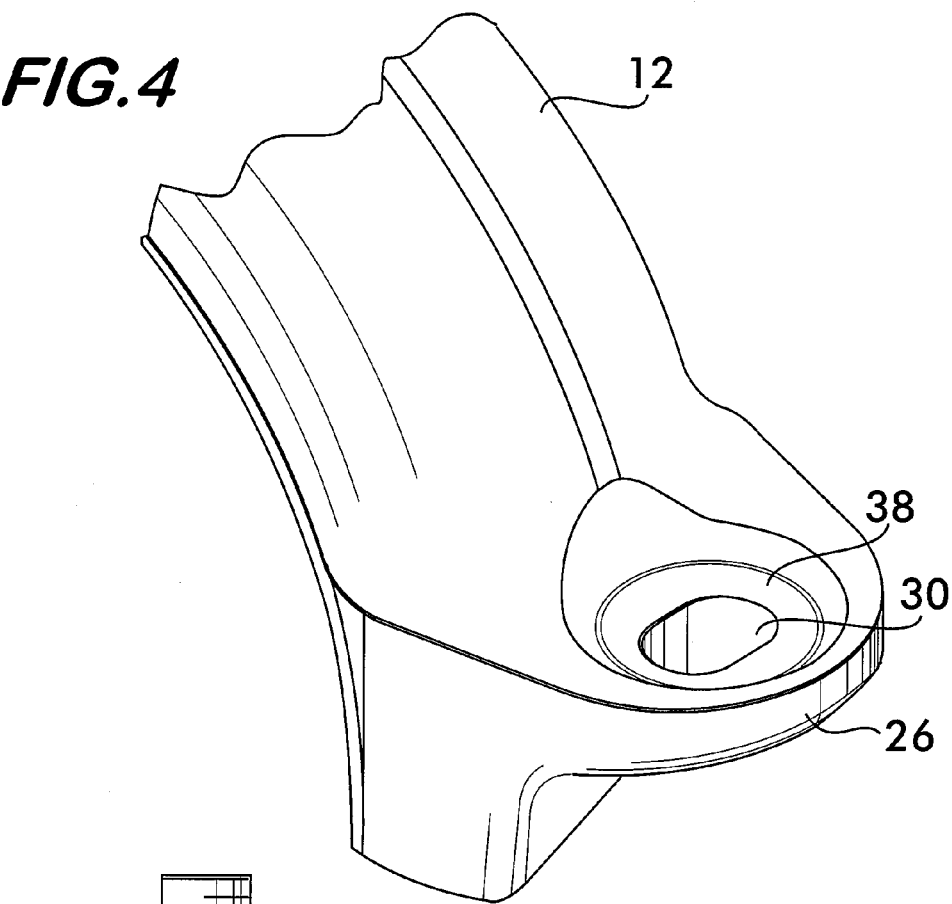
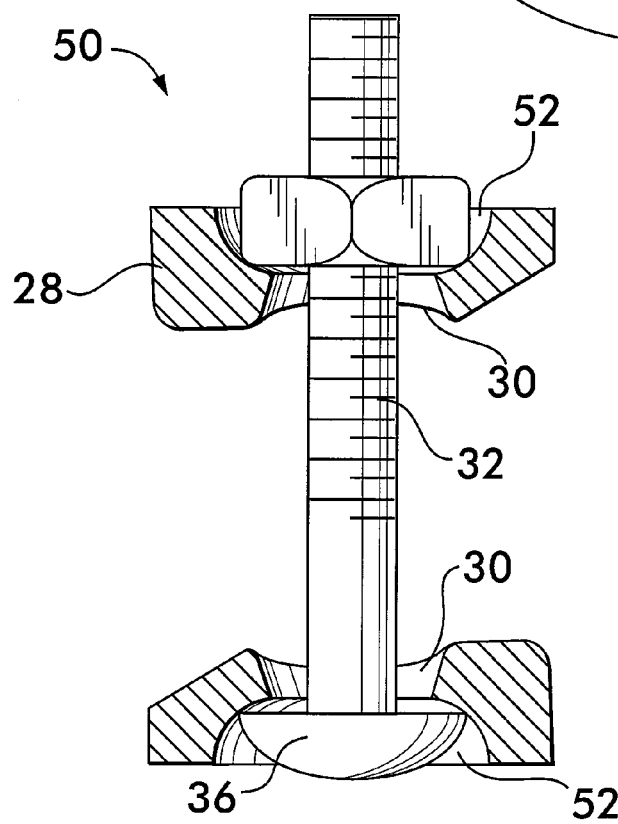

COUPLING WITH CONCAVE BEARING SURFACE

FIELD OF THE INVENTION

This invention concerns mechanical pipe couplings for joining pipe elements to one another, the pipe couplings having connection members with concave bearing surfaces that reduce the torque required to effect a pipe joint.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Each mechanical coupling segment comprises a bridge structure having arcuate surfaces which project radially inwardly and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The bridge structure defines an annular channel that receives a gasket or seal, typically an elastomeric ring which engages the ends of each pipe element and cooperates with the segments to provide a fluid tight seal.

The segments have connection members positioned at each end, typically in the form of lugs which project outwardly from the bridge structure. The lugs are adapted to receive threaded fasteners, such as nuts and bolts, which are adjustably tightenable to draw the segments toward one another and clamp circumferentially around the ends of the pipe elements.

Considerable torque may be required to tighten the fasteners and effect a fluid-tight seal that has the desired stiffness about the bending and torsional axes of the joint. It is advantageous to take steps to reduce the required fastener torque so that technicians can easily install the couplings in the field manually with hand tools. Reduced required torque also increases battery life when battery powered impact drivers are used to install couplings. The torque reduction is desirable for all types of couplings, and especially for deformable couplings.

SUMMARY OF THE INVENTION

The invention concerns pipe coupling segments interconnectable to one another using threaded fasteners. The segments have retaining elements at opposite ends. Each of the coupling segments is positionable for straddling facing ends of a pair of pipe elements for securing the pipe elements together in end-to-end relationship. At least one of the coupling segments comprises a bridge structure having opposite ends. A pair of arcuate surfaces is positioned on the bridge structure. Each of the arcuate surfaces is disposed to interface circumferentially with the outer surface of one of the pipe elements. Connection members project outwardly from the opposite ends of the coupling segment. At least one of the connection members comprises a concave bearing surface having an aperture therethrough for receiving one of the fasteners. The concave bearing surface is sized so as to contact one of the retaining elements. The retaining element is rotatable relatively to the concave bearing surface upon tightening of the fastener for drawing the coupling segments into engagement with the pipe elements.

Preferably, the concave bearing surface is conical and has a cone angle between about 60 and about 170 degrees. Cone angles between 118 degrees and about 124 degrees are particularly advantageous.

The invention also encompasses a bearing plate adapted to engage a threaded fastener having retaining elements at opposite ends. The bearing plate comprises a concave bearing surface surrounding an aperture therethrough for receiving the fastener. The concave bearing surface is sized so as to contact one of the retaining elements. The retaining element is rotatable relatively to the concave bearing surface upon tightening of the fastener.

For the bearing plate as well, the concave bearing surface is preferably conical and has a cone angle between about 60 and about 170 degrees. Again, cone angles between 118 and 124 degrees are particularly advantageous.

The invention also includes method of securing facing ends of pipe elements together in end-to-end relationship. The method comprises:

providing a pipe coupling assembly having a pair of coupling segments attached to one another end-to-end surrounding a central space, the coupling segments having arcuate surfaces disposed to interface circumferentially with the outer surfaces of the pipe elements, the coupling segments having connection members projecting outwardly from opposite ends thereof, the connection members each having a concave bearing surface surrounding an aperture therethrough for receiving a threaded fastener having retaining elements at opposite ends, the concave bearing surface being sized to contact one of the retaining elements;

inserting ends of the pipe elements into the central space;

tightening the fasteners by rotating one of the retaining elements, thereby moving the coupling segments toward one another, the retaining element contacting the concave bearing surface and rotating relatively thereto.

BRIEF DESCRIPTION OF THE DRAWINGS

FIG. 2 is a cross-sectional view taken at line 2-2 of FIG. 1;

FIGS. 2A and 2B sectional show portions of FIG. 2 on an enlarged scale;

FIG. 4 is a perspective view of a portion of the coupling assembly according to the invention;

FIG. 7 shows another embodiment of a coupling assembly according to the invention.

DETAILED DESCRIPTION OF THE EMBODIMENTS

Figure 1:
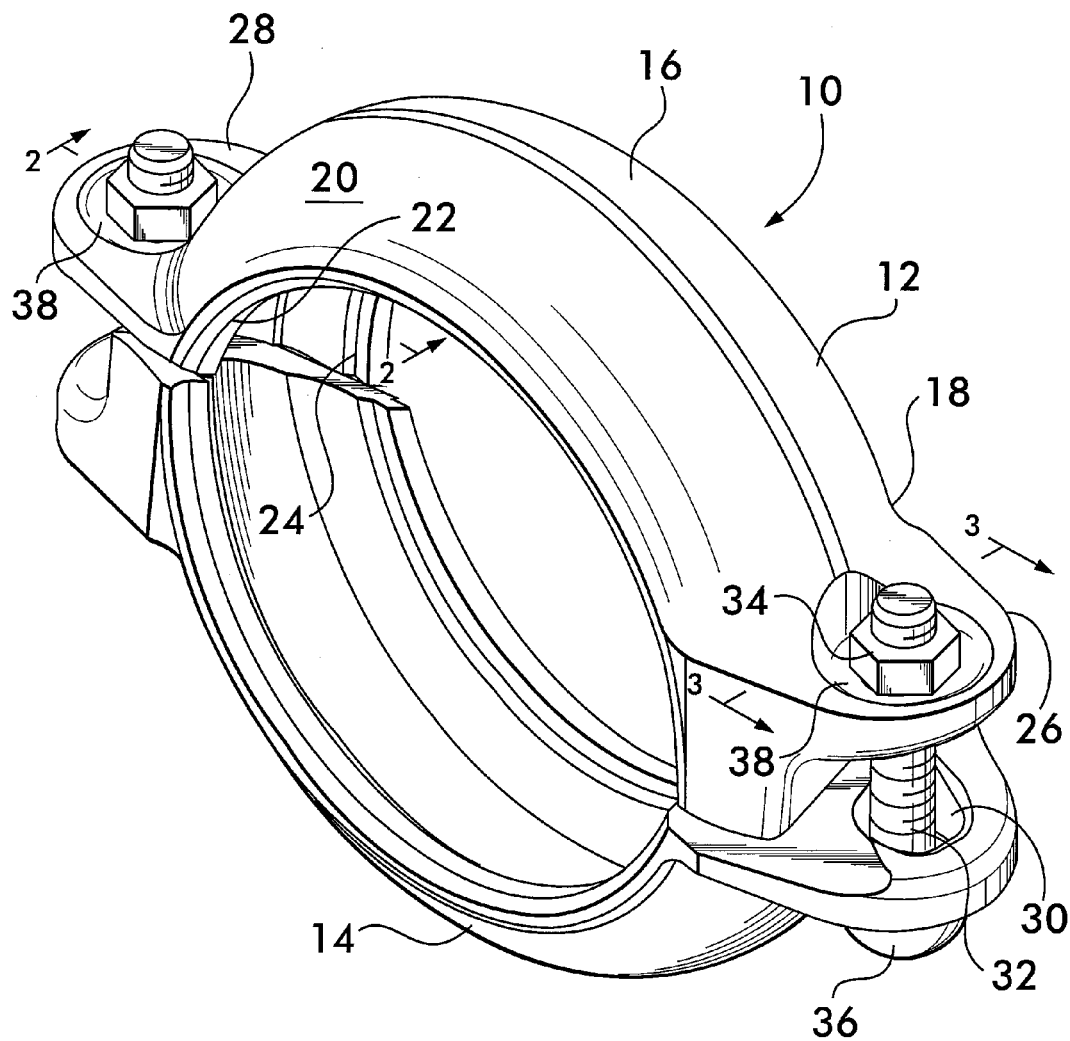
FIG. 1 is a perspective view of a coupling assembly according to the invention.

FIG. 1 shows a pipe coupling assembly 10 according to the invention. In this example, coupling assembly 10 is formed of two coupling segments 12 and 14, it being understood that assemblies comprising more than two segments are also feasible. The segments 12 and 14 each have a bridge structure 16 with opposite ends 18 and 20. A pair of arcuate surfaces 22 and 24 is positioned on each bridge structure. The surfaces 22 and 24 project radially inwardly and are disposed to interface circumferentially with the outer surfaces of pipe elements as described in detail below.

Each segment also has a pair of connection members 26 and 28 positioned at respective opposite ends 18 and 20 of each segment 12 and 14. Preferably, the connection member 26 and 28 take the form of lugs as shown in the illustrated example, each lug having an aperture 30 that receives a threaded fastener, such as bolt 32. Bolt 32 cooperates with a nut 34 to secure the coupling segments 12 and 14 in end-to-end relation to form the coupling assembly 10.

Each fastener has retaining elements at opposite ends. In the example nut and bolt, the retaining elements comprise the bolt head 36 and the nut 34. At least one of the retaining elements is rotatable to tighten the fastener and draw the coupling segments toward one another as described below.

Figure 2B:
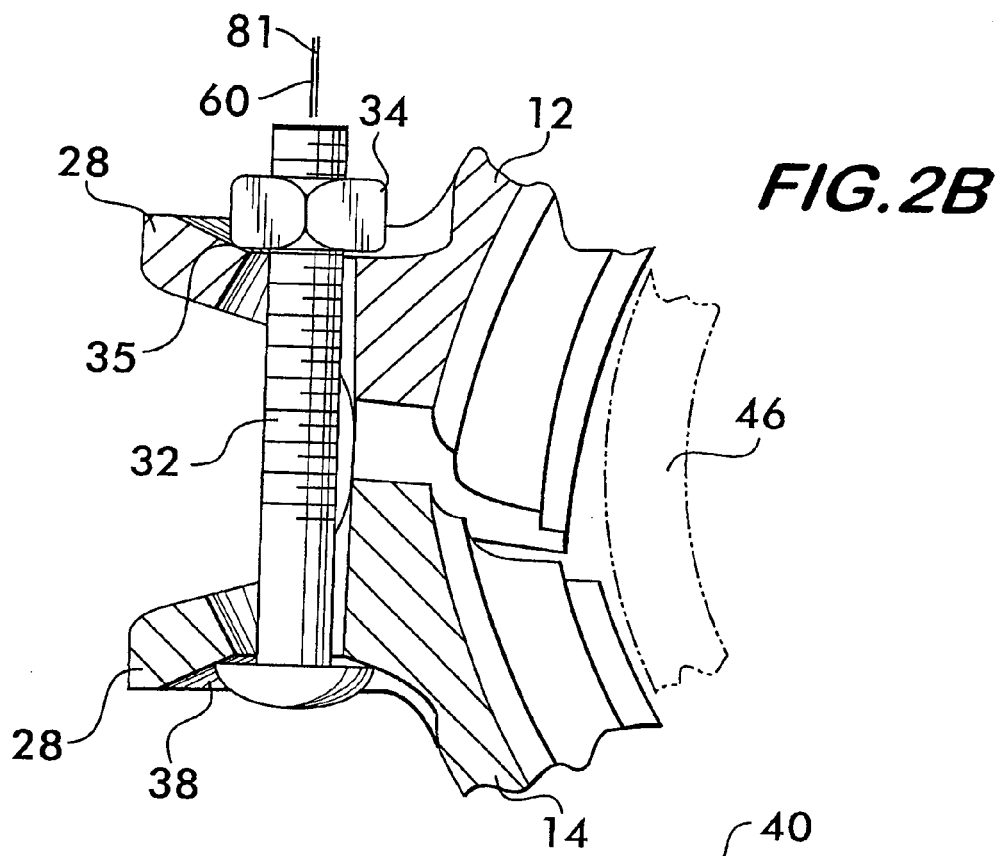
Figure 3:
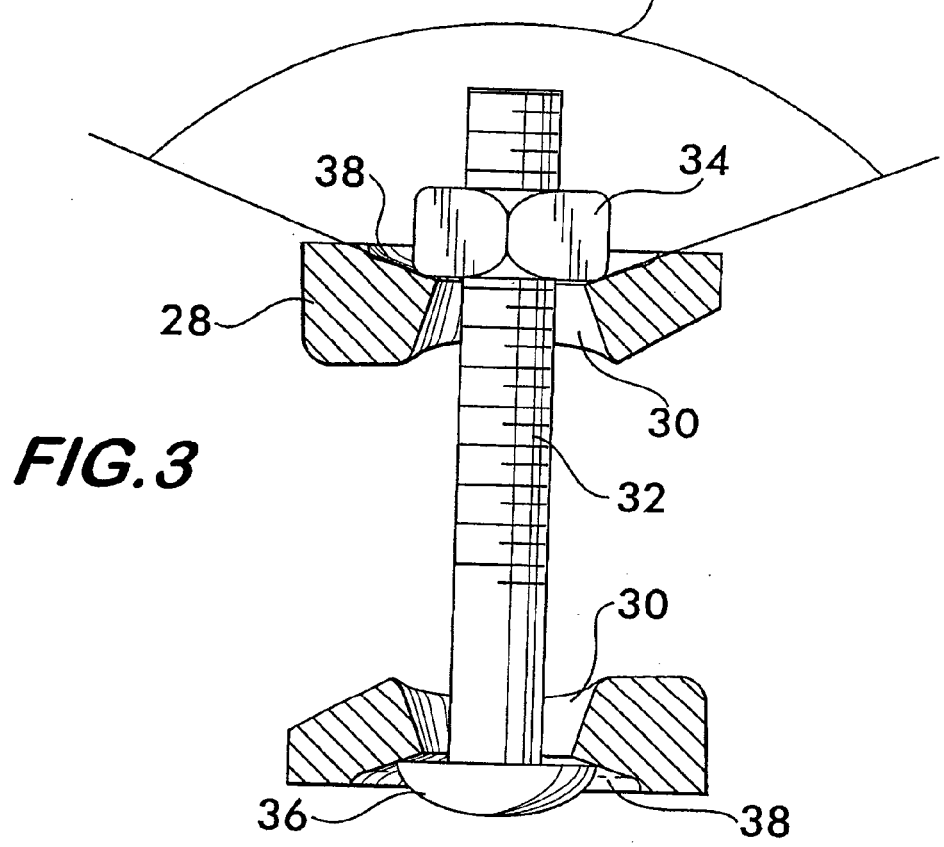
FIG. 3 is a cross-sectional view taken at line 3-3 of FIG. 1.

As best shown in FIGS. 2 and 3, at least one of the retaining elements, for example, nut 34, engages a concave bearing surface 38 positioned surrounding the aperture 30 on at least one of the connection members 28. The description that follows is confined to one retaining element and one connection member, it being understood that some or all of the connection members may have the concave bearing surface 38, and each of the retaining elements (i.e., bolt heads and nuts) may engage these bearing surfaces.

As best shown in FIG. 3, concave bearing surface 38 is preferably conical and has a cone angle 40 between about 60 degrees and about 170 degrees. Cone angles 40 between about 118 degrees and about 124 degrees are particularly advantageous as discussed further below. The bearing surface also may have a round planform shape, or be oval, as illustrated in the partial perspective view of FIG. 4, to accommodate a slotted aperture 30 that allows lateral and rotational motion of the coupling segments relative to one another when being engaged with pipe elements.

The concave bearing surface 38 is sized so that a retaining element of the fastener, in this example nut 34, engages the concave bearing surface as it is rotated to tighten the fastener. Unlike prior art couplings wherein the nut or bolt head engages a flat surface (which is angularly oriented to the fastener in the case of deformable coupling segments), in a coupling segment according to the invention, the nut engages a concave, preferably conical surface, and rotates against it to draw the coupling segments forcibly toward each other to effect a pipe joint as described in detail below. The nut is preferably a "finished nut" which has edges chamfered as described in ASME/ANSI Standard B18.2.2-1987.

Figure 5:
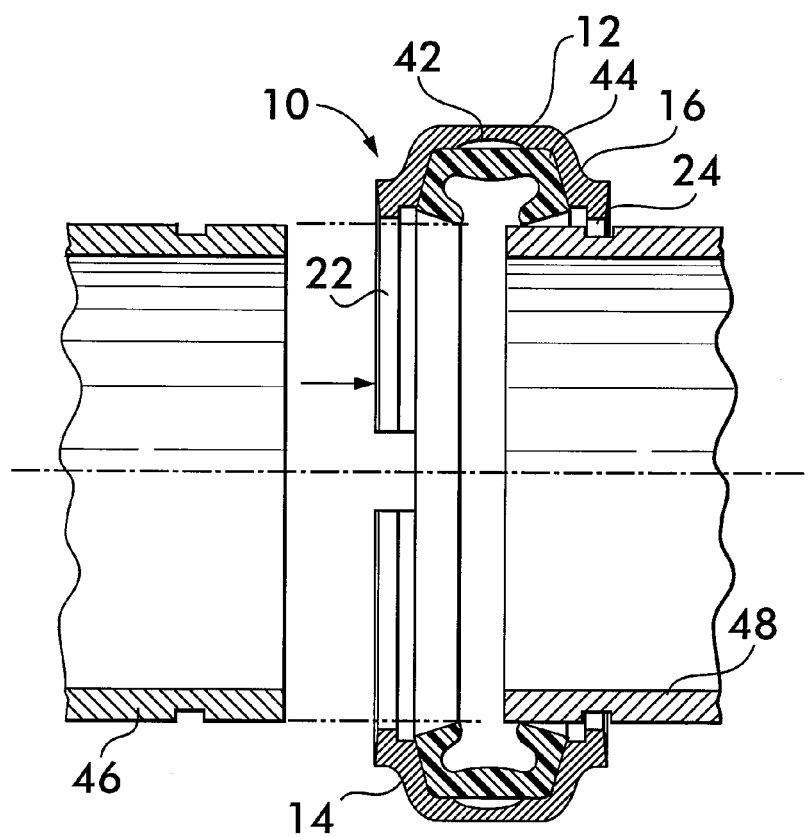
FIGS. 5 and 6 illustrate steps in the method for creating a pipe joint using the pipe coupling segments according to the invention.
Figure 6:
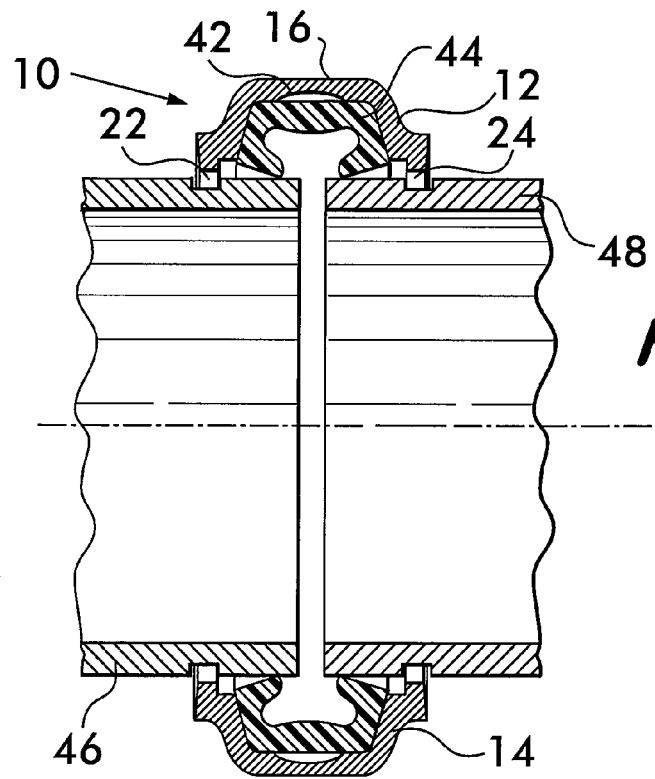

FIGS. 5 and 6 illustrate the coupling assembly 10 according to the invention in use. The bridge structure 16 forms a channel 42 that receives a sealing member, in this example an elastomeric ring 44. Pipe elements 46 and 48 are positioned between the coupling segments 12 and 14 forming the coupling assembly 10 and engaged with the ring seal 44. This may be effected by positioning the seal in engagement with both pipe elements and then assembling the segments around the seal, or preferably, as illustrated in FIG. 5, by inserting the ends of the pipe elements 46 and 48 into a pre-assembled coupling. Once both ends of pipe elements 46 and 48 are engaged with the seal and positioned between the coupling segments the fasteners are tightened.

As shown in FIG. 2A, the plane of the concave bearing surface 38 can be angularly oriented with respect to an axis 60 through the bolt 32. The offset angle 81 can be as great as 10 degrees. As the fasteners joining the segments 12 and 14 are tightened, the coupling segments 12 and 14 engage the pipe elements 46 and 48 (not shown) and deform so that the arcuate surfaces 22 (not shown) and 24 on each segment engage the outer surfaces of the pipe elements. As the bolts are tightened the bridge structure 16 may be designed to deform around the pipe elements. When this is the case, the angular orientation of the concave bearing surfaces relative to the axis 60 will change, with the orientation angle 81 being reduced as a result of angular rotation of the connection members in which the concave bearing surface is situated (see FIG. 2B). The orientation angle 81 of the concave bearing surface is designed such that, at the closed position of the coupling assembly, it is reduced to about zero degrees. Note that at the closed position, the bolt torque and bolt load are at their greatest values. By having the concave bearing surface orientation angle 81 reduced to zero at the closed position of the coupling, the bolts are evenly stressed along their circumference (no bending stress imposed) and remain straight.

If the couplings are not designed to deform around the pipe element, the concave bearing surface orientation angle will start and remain substantially at zero degrees during coupling installation.

Furthermore, the coupling segments 12 and 14 may, for example, be designed to have a greater radius of curvature than the pipe elements and subtend an angle of less than 180 degrees as described in U.S. Pat. No. 7,086,131, hereby incorporated by reference herein. Alternately, the coupling segments may be designed to have different radii of curvature as described in U.S. patent application Ser. No. 11/448,405, hereby incorporated by reference herein.

Regardless of the type of deformable coupling, nut 34 engages the concave bearing surface 38 as shown in FIG. 2A. If the concave bearing surface were not present, as in a coupling according to the prior art, the outer edge 35 of nut 34 would engage a substantially flat, angularly oriented surface over a small point-like surface area. This would result in high contact stress between the nut and the surface, leading to high frictional force between the nut and the surface as the nut traverses the surface when it is tightened. Due to the high friction, high torque would be required to tighten the nut. However, in the coupling segment according to the invention, the outer edge 35 of the nut engages the concave bearing surface 38 over a larger, line-like extended surface area. This lowers the contact stresses between the nut and the lug, lowering the friction between the nut and the lug, and thereby lowering the torque required to tighten the nut and deform the coupling segments 12 and 14 as necessary to engage the arcuate surfaces with the pipe elements. As the nut is further tightened, as shown in FIG. 2B, the concave bearing surface orientation angle 81 diminishes as the coupling segments are further deformed. It is understood that, depending on the particular design of the coupling segment with respect to the fasteners, the bolt 32 may be tightened instead of or in addition to the nut, with the concave bearing surface 38 providing the reduced torque advantage regardless of the design details.

Considerable fastener tension force may be necessary to ensure adequate stiffness to the joint, fluid tightness, and enough force to deform the coupling segments and conform them with the shape of the pipe elements. The torque required to attain this level of force in the fasteners is proportional to the force, and, by use of the concave bearing surface, the amount of torque required to attain a particular tension force in a particular bolt is smaller when the rotating retaining member engages a concave bearing surface according to the invention.

It has been found experimentally that the engagement of the rotating retaining element, in this case, nut 34, with a concave bearing surface reduces the torque required to assemble the segments into a pipe joint by 50-60% over prior art couplings of the same size having the same size and type of fastener. The torque reduction is believed to be a result of an increase in contact surface area occasioned by the engagement of substantially complementary surfaces of the fastener retaining element and the bearing surface of the lug over a line-like area instead of a point-like area. Increased surface area decreases the contact stresses between the engaged parts. High contact stresses are to be avoided because they cause high friction and result in damage between contacting parts moving relatively to one another.

In another invention embodiment 50, shown in FIG. 7, the concave bearing surface 52 may be spherical rather than conical in shape. A spherical concave bearing surface is also expected to provide a reduction in the torque required to assemble a coupling.

The concave bearing surface is not confined to use with pipe couplings but may be used to reduce the applied torque needed in any situation where a rotating retaining element bears against a bearing surface. In addition to reducing required torque, the concave bearing surface also reduces the wear on the underside of the nut or bolt head and lowers the energy required to assemble the coupling.

What is claimed is:

1. In combination, pipe coupling segments and a threaded fastener, said coupling segments being interconnectable to one another using said threaded fastener, said threaded fastener having retaining elements at opposite ends, each said coupling segment being positionable for straddling facing ends of a pair of pipe elements for securing said pipe elements together in end-to-end relationship, at least one of said coupling segments comprising:
   a bridge structure having opposite ends;
   a pair of arcuate surfaces positioned on said bridge structure, each said arcuate surface being disposed to interface circumferentially with the outer surface of one of said pipe elements; and
   connection members projecting outwardly from said opposite ends of said coupling segment, at least one of said connection members comprising a concave bearing surface having an aperture therethrough for receiving said fastener, said concave bearing surface surrounding said aperture, the concaveness of said concave bearing surface is uniform around the central vertical axis of said aperture, said concave bearing surface being sized to contact one of said retaining elements, said one retaining element having a contact surface engageable with said concave bearing surface, said contact surface having a shape not matched to said concave bearing surface for reducing the torque required to rotate said one retaining element relatively to said concave bearing surface upon tightening of said fastener for drawing said coupling segments into engagement with said pipe elements.

2. The combination according to claim 1, wherein said concave bearing surface is conical.

3. The combination according to claim 2, wherein said concave bearing surface has a cone angle between about 60 degrees and about 170 degrees.

4. The combination according to claim 2, wherein said concave bearing surface has a cone angle between about 118 degrees and about 124 degrees.

5. The combination according to claim 1, wherein said concave bearing surface is spherical.

6. The combination according to claim 1, wherein said concave bearing surface has an oval shape.

7. The combination according to claim 1, wherein said concave bearing surface has an orientation angle relative to an axis extending through said fasteners.

8. The combination according to claim 7, wherein said orientation angle is a great as 10 degrees.

9. A pipe coupling assembly for securing pipe elements together in end-to-end relationship, each said coupling assembly comprising:
   a plurality of coupling segments connected in end to end relationship by threaded fasteners having retaining elements at opposite ends, said coupling segments being positionable straddling facing ends of a pair of said pipe elements, each said coupling segment comprising:
   a bridge structure having opposite ends;
   a pair of arcuate surfaces positioned on said bridge structure, each said arcuate surface being disposed to interface circumferentially with the outer surface of one of said pipe elements; and
   connection lugs projecting outwardly from said opposite ends of said coupling segment, said connection lugs each having a concave bearing surface surrounding an aperture therethrough for receiving one of said fasteners, the concaveness of said concave bearing surface is uniform around the central vertical axis of said aperture, said concave bearing surface being sized to contact one of said retaining elements, said one retaining element having a contact surface engageable with said concave bearing surface, said contact surface having a shape not matched to said concave bearing surface for reducing the torque required to rotate said retaining element relatively to said concave bearing surface upon tightening of said fastener for drawing said coupling segments into engagement with said pipe elements.

10. The coupling assembly according to claim 9, wherein said concave bearing surfaces being conical.

11. The coupling assembly according to claim 10, wherein said concave bearing surfaces having a cone angle between about 60 degrees and about 170 degrees.

12. The coupling assembly according to claim 10, wherein said concave bearing surfaces having a cone angle between about 118 degrees and about 124 degrees.

13. The coupling assembly according to claim 9, wherein said concave bearing surfaces being spherical.

14. The coupling assembly according to claim 9, wherein said concave bearing surfaces having an oval shape.

15. The coupling assembly according to claim 9, comprising a pair of said segments.

16. In combination, a pipe coupling assembly and a pair of pipe elements, said pipe coupling assembly securing said pipe elements to one another in end-to-end relationship, said coupling assembly comprising:
   a plurality of coupling segments connected in end to end relationship by threaded fasteners each having retaining elements at opposite ends, said coupling segments being positioned straddling facing ends of said pair of pipe elements, each said coupling segment comprising:
   a bridge structure having opposite ends;
   a pair of arcuate surfaces positioned on said bridge structure, each said arcuate surface being disposed to interface circumferentially with the outer surface of one of said pipe elements; and
   lug members projecting outwardly from said opposite ends of said coupling segments, said lug members each having a concave bearing surface surrounding an aperture therethrough for receiving one of said fasteners, the concaveness of said concave bearing surface is uniform around the central vertical axis of said aperture, said concave bearing surface being sized to contact one of said retaining elements, said one retaining element having a contact surface engageable with said concave bearing surface, said contact surface having a shape not matched to said concave bearing surface for reducing the torque required to rotate said retaining element relatively to said concave bearing surface upon tightening of said fastener for drawing said coupling segments into engagement with said pipe elements.

17. The combination according to claim 16, wherein said concave bearing surfaces are conical.

18. The combination according to claim 17, wherein said concave bearing surfaces having a cone angle between about 60 degrees and about 170 degrees.

19. The combination according to claim 17, wherein said concave bearing surfaces having a cone angle between about 118 degrees and about 124 degrees.

20. The combination according to claim 16, wherein said concave bearing surfaces being spherical.

21. The combination according to claim 16, wherein said concave bearing surfaces having an oval shape.

22. The combination according to claim 16, comprising a pair of said coupling segments.

23. The combination according to claim 16, further comprising circumferential grooves positioned in said end portions of said pipe elements, said outer surfaces of said pipe elements being at least in part included within said grooves, said coupling segments being deformable upon adjustable tightening of said connection members so as to engage said arcuate surfaces with the outer surfaces of said pipe elements within said grooves for joining said pipe elements in said end-to-end relation.

24. A method of securing facing ends of pipe elements together in end-to-end relationship, said method comprising:
providing a pipe coupling assembly having a pair of coupling segments attached to one another end-to-end surrounding a central space, said coupling segments having arcuate surfaces disposed to interface circumferentially with the outer surfaces of said pipe elements, said coupling segments having connection members projecting outwardly from opposite ends thereof, said connection members each having a concave bearing surface surrounding an aperture therethrough for receiving a threaded fastener having a finished hex nut at at least one end thereof, the concaveness of said concave bearing surface is uniform around the central vertical axis of said aperture, said concave bearing surface being sized to contact said finished hex nut for reducing the torque required to rotate said finished hex nut relatively to said concave bearing surface;
inserting ends of said pipe elements into said central space; and
tightening said fasteners by rotating said finished hex nut, thereby moving said coupling segments toward one another, said finished hex nut contacting said concave bearing surface and rotating relatively thereto.

25. In combination, pipe coupling segments and a threaded fastener, said coupling segments being interconnectable to one another using said threaded fastener, said threaded fastener having a finished hex nut at at least one end thereof, each said coupling segment being positionable for straddling facing ends of a pair of pipe elements for securing said pipe elements together in end-to-end relationship, at least one of said coupling segments comprising:
a bridge structure having opposite ends;
a pair of arcuate surfaces positioned on said bridge structure, each said arcuate surface being disposed to interface circumferentially with the outer surface of one of said pipe elements; and
connection members projecting outwardly from said opposite ends of said coupling segment, at least one of said connection members comprising a concave bearing surface having an aperture therethrough for receiving one of said fasteners, said concave bearing surface surrounding said aperture, the concaveness of said concave bearing surface is uniform around the central vertical axis of said aperture, said concave bearing surface being sized to contact said finished hex nut and reduce the torque required to rotate said finished hex nut relatively to said concave bearing surface, said finished hex nut not being rotatable relatively to said concave bearing surface upon tightening of said fastener for drawing said coupling segments into engagement with said pipe elements.

26. A pipe coupling assembly for securing pipe elements together in end-to-end relationship, each said coupling assembly comprising:
a plurality of coupling segments connected in end to end relationship by threaded fasteners, at least one said fastener having a finished hex nut at at least one end thereof, said coupling segments being positionable straddling facing ends of a pair of said pipe elements, each said coupling segment comprising:
a bridge structure having opposite ends;
a pair of arcuate surfaces positioned on said bridge structure, each said arcuate surface being disposed to interface circumferentially with the outer surface of one of said pipe elements; and
connection lugs projecting outwardly from said opposite ends of said coupling segment, said connection lugs each having a concave bearing surface surrounding an aperture therethrough for receiving one of said fasteners, the concaveness of said concave bearing surface is uniform around the central vertical axis of said aperture, said concave bearing surface being sized to contact said finished hex nut for reducing the torque required to rotate said finished hex nut relatively to said concave bearing surface upon tightening of said fastener for drawing said coupling segments into engagement with said pipe elements.

* * * * *